(12) United States Patent
LeCrone et al.

(10) Patent No.: US 9,170,904 B1
(45) Date of Patent: Oct. 27, 2015

(54) I/O FAULT INJECTION USING SIMULATED COMPUTING ENVIRONMENTS

(75) Inventors: Douglas E. LeCrone, Hopkinton, MA (US); Jeffrey L. Jones, Whitinsville, MA (US); Paul A. Linstead, Shrewsbury, MA (US); Denis J. Burt, Plymouth, MA (US); Bruce A. Pocock, Titusville, FL (US)

(73) Assignee: EMC Corporation, Hopkinton, MA (US)

( * ) Notice: Subject to any disclaimer, the term of this patent is extended or adjusted under 35 U.S.C. 154(b) by 1885 days.

(21) Appl. No.: 12/215,984

(22) Filed: Jun. 30, 2008

(51) Int. Cl.
*G06F 11/00* (2006.01)
*G06F 11/26* (2006.01)
*G06F 11/36* (2006.01)

(52) U.S. Cl.
CPC .......... *G06F 11/261* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 4,999,837 A * | 3/1991 | Reynolds et al. | 714/703 |
| 5,671,352 A * | 9/1997 | Subrahmaniam et al. | 714/41 |
| 6,182,248 B1 * | 1/2001 | Armstrong et al. | 714/43 |
| 6,539,503 B1 * | 3/2003 | Walker | 714/703 |
| 7,165,201 B2 | 1/2007 | Groz | |
| 7,174,274 B2 | 2/2007 | Carlson et al. | |
| 7,185,232 B1 | 2/2007 | Leavy et al. | |
| 2003/0028508 A1 * | 2/2003 | Quinlan | 707/1 |
| 2004/0267866 A1 * | 12/2004 | Carollo et al. | 709/200 |
| 2006/0004554 A1 * | 1/2006 | Vega et al. | 703/6 |
| 2008/0123681 A1 * | 5/2008 | Hathorn et al. | 370/437 |
| 2008/0243467 A1 * | 10/2008 | Chan et al. | 703/25 |
| 2009/0249301 A1 * | 10/2009 | Kalla et al. | 717/127 |

OTHER PUBLICATIONS

Loveland, et al., "Testing z/OS: The premier operating system for IBM's zSeries server," IBM Systems Journal, vol. 41, No. 1, 2002, pp. 55-73.
Plambeck, et al., "Development and attributes of z/Architecture," IBM J. Res. & Dev., vol. 46, No. 4/5, Jul./Sep. 2002, pp. 367-379.
"z/Architecture: Principles of Operation," IBM, SA22-7832-04, 2005, pp. 1-58.
"Hercules—General Information," Hercules System/370, ESA/390, z/Architecture Emulator, Version 3, Release 05, Modification 0, Publication No. HEGI030500-00, Sep. 1, 2007, pp. 1-140.
DeCusatis, et al., "Fiber optic interconnects for the IBM S/390 Parallel Enterprise Server G5," IBM J. Res. Develop., vol. 43, No. 5/6, Sep./Nov. 1999, pp. 807-828.
Wyman, et al., "Multiple-logical-channel subsystems: Increasing zSeries I/O scalability and connectivity," IBM J. Res. & Dev., vol. 48, No. 3/4, May/Jul. 2004, pp. 489-505.

(Continued)

*Primary Examiner* — Gabriel Chu
(74) *Attorney, Agent, or Firm* — Muirhead and Saturnelli, LLC

(57) ABSTRACT

A system for injecting I/O faults into a closed system, for example, the injection of link level I/O faults, involves the use of a simulated computing environment. In an embodiment, the system provides for fault injection using an emulated IBM System z environment and including the use of FICON and/or other suitable communication channel protocols. The emulated System z environment may include a simulated z/OS and/or emulated System z hardware and software components.

16 Claims, 6 Drawing Sheets

(56) References Cited

OTHER PUBLICATIONS

"IBM system z10 Enterprise Class (z10 EC) Reference Guide," IBM, Feb. 2008, 49 pp.

"Introducing PSI System64™ The 64-Bit Open Mainframe for Today's z/Os Datacenter," Platform Solutions, Inc., Aug. 13, 2007, SHARE Session 9800, http://www.platform-solutions.com/literature.php, 36 pp.

* cited by examiner

I/O FAULT INJECTION USING SIMULATED COMPUTING ENVIRONMENTS

TECHNICAL FIELD

This application relates to the field of computer systems and, more particularly, to emulation, simulation and testing of computing systems, including software and hardware platforms used therewith, and including the injection of I/O faults.

BACKGROUND OF THE INVENTION

Mainframe computers are large scale computer system architectures that are used by large organizations for bulk data processing, such as financial transaction processing. Mainframe computers offer enhanced availability, scalability, reliability and security along with high volume data throughput, among other features. For example, IBM Corporation's System z is a mainframe platform and computing environment that is widely used in the industry and that includes z/Architecture-based systems and zSeries mainframes. System z components may operate with IBM's z/OS (operating system) and/or other zSeries operating systems. Input/Output (I/O) devices may be coupled to interact with mainframe computers, such as IBM's System z computing environment, that may include an I/O subsystem that communicates with the I/O devices over communication channels. The I/O subsystem controls data flow between I/O devices and main storage. The I/O subsystem may be coupled to the central processors of the main system and may communicate directly with the I/O devices. I/O subsystem may communicate with the I/O devices using multiple types of interfaces, including, for example, communication channels such as Fibre channels.

Software may be designed to emulate, and/or otherwise simulate, other programs, such as operating systems. For example, it may be desirable to emulate IBM's z/OS operating system using software. It is also possible to emulate, or and/or otherwise simulate, hardware systems, such as processors, used in connection with computing systems. For example, it may be desirable to emulate components of IBM's z/Architecture computing systems. Emulation of hardware and software systems may be useful in connection with testing and other operations of I/O devices and/or other software applications and hardware components that interface with a computing environment, such as IBM's System z. One reason, in particular, for emulation is that the cost of running a System z environment may be significant. For further discussion of z/OS and z/Architecture components, see, for example, Loveland, et al., "Testing z/OS: The premier operating system for IBM's zSeries server," IBM Systems Journal, Vol. 41, No. 1, 2002, pp. 55-73, and Plambeck, et al., "Development and attributes of z/Architecture," IBM J. Res. & Dev., Vol. 46, No. 4/5, July/September 2002, pp. 367-379, which are incorporated herein by reference. See also, *z/Architecture: Principles of Operation*, IBM, SA22-7832-04, 2005 for a detailed z/Architecture description.

Accordingly, it would be desirable to provide for the improved software and hardware emulation and/or simulation of operating systems and computing architectures, such as the z/OS operating system and z/Architecture computing systems, and the use of emulated systems in connection with testing, compatibility and other issues. For example, using emulated systems in a testing environment may allow for the evaluation of fault tolerance of various components through managed fault injection, i.e. the controlled generation of fault conditions at various points in the system to evaluate the effect on actual components being tested.

SUMMARY OF THE INVENTION

According to the system described herein, a method for injecting I/O faults includes providing a simulated computing environment, wherein the simulated computing environment includes a simulated operating system. The simulated computing environment is accessed with a fault injector. I/O Faults may be injected into the simulated computing environment. The simulated operating system may be a simulated z/OS. The simulated computing environment may include a simulated System z platform. The simulated System z platform may include a simulated I/O subsystem that is modifiable with the fault injector. The simulated computing environment may include a channel emulator. The channel emulator may act as an I/O subsystem providing FICON communication capability. Injecting I/O faults into the simulated computing environment may include injecting I/O faults into the simulated operating system.

According further to the system described herein, a computer-readable medium stores computer software that injects I/O faults, the computer software including executable code that provides a simulated computing environment, wherein the simulated computing environment includes a simulated operating system. Executable code may access the simulated computing environment with a fault injector. Executable code may inject I/O faults into the simulated computing environment. The simulated operating system may be a simulated z/OS. The simulated computing environment may include a simulated System z platform. The simulated System z platform may include a simulated I/O subsystem that is modifiable with the fault injector. The simulated computing environment may include a channel emulator. The channel emulator may act as an I/O subsystem providing FICON communication capability. The executable code that injects I/O faults into the simulated computing environment may include executable code that injects I/O faults into an I/O portion of the simulated operating system.

According further to the system described herein, a fault injection system includes a simulated computing environment, wherein the simulated computing environment includes a simulated operating system. A fault injector is coupled to the simulated computing environment and injects I/O faults into the simulated computing environment. The simulated operating system may be a simulated z/OS. The simulated computing environment may include a simulated System z platform. The simulated System z platform may include a simulated I/O subsystem that is modifiable with the fault injector. The simulated computing environment may include a channel emulator. The channel emulator may act as an I/O subsystem providing FICON communication capability. The fault injector may inject I/O faults into an I/O portion of the simulated operating system.

According further to the system described herein, a method for simulated computer environment processing includes providing a simulated computing environment, wherein the simulated computing environment provides simulated z/OS functionality. A z/OS process may be run on the simulated computing environment. The simulated computing environment may include a simulated System z platform. The simulated computing environment may include a channel emulator. The channel emulator may act as an I/O subsystem providing FICON communication capability.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
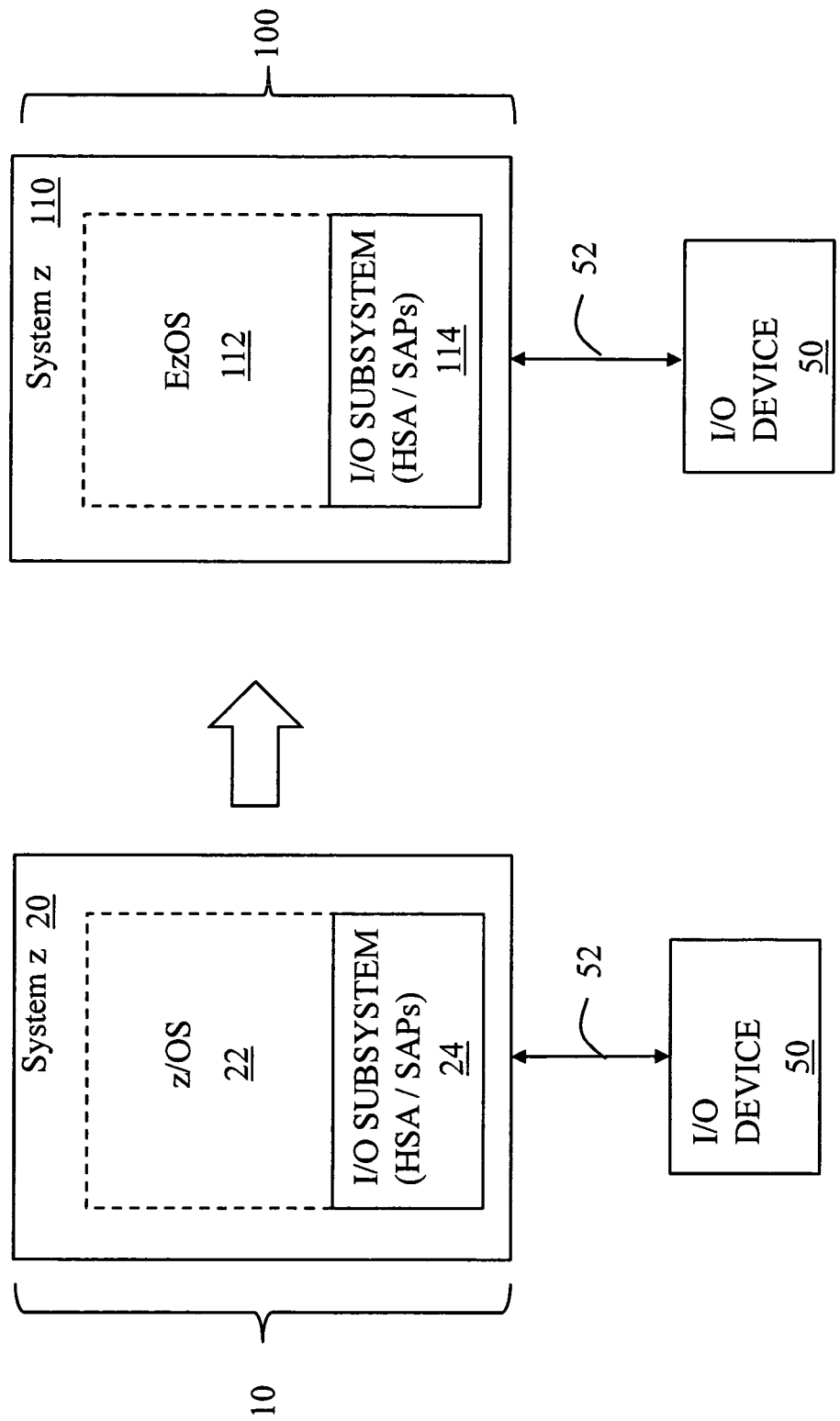
FIG. 1 is a schematic illustration showing use of a simulated z/OS (EzOS) on System z hardware system according to an embodiment of the system described herein.

Referring now to the figures of the drawing, the figures comprise a part of this specification and illustrate exemplary embodiments of the described system. It is to be understood that in some instances various aspects of the system may be shown schematically or may be shown exaggerated or altered to facilitate an understanding of the system.

In an embodiment of the system described herein, a simulated z/OS may be provided to emulate and/or otherwise simulate IBM's z/OS by having a z/OS-like interface and hardware structures. Further, in other embodiments, System z hardware components, such as z/Architecture processors, may be emulated and/or otherwise simulated and used in connection with the simulated z/OS and including emulation of I/O channels, as further discussed elsewhere herein. The use of a simulated z/OS and/or simulated System z hardware may provide reduced costs. A simulated z/OS system may be referred to herein as "EzOS". The system described herein may provide for fault injection and/or other testing capabilities using a simulated operating system, such as EzOS, and/or other simulated hardware or software components, as further discussed elsewhere herein.

FIG. 1 is a schematic illustration showing a system 100 in which a simulated z/OS (EzOS) 112 runs on System z hardware 110 according to an embodiment of the system described herein. As shown in FIG. 1, a known system 10 including System z hardware 20 running z/OS 22 coupled to an I/O device 50 is illustrated in comparison to a system 100 including System z hardware 110 running a simulated operating system, such as the EzOS 112 according to an embodiment of the system described herein. The I/O device 50 may include physical storage volumes and/or logical volumes. An example of the I/O device 50 may be EMC Corporation's Symmetrix data storage facility. According to the system described herein, I/O operations of the I/O device 50 may be substantially unaffected when using the system 100 as compared with the known system 10. The I/O device 50 may communicate with the system 10 or the system 100 using a channel 52. In an embodiment, the channel 52 is a FICON channel, as further discussed elsewhere herein, but the system described herein may also operate with other suitable connectivity channels using different protocols. It should be noted that, although not illustrated, other devices and controllers may be disposed between the I/O device 50 and the system 10 or the system 100 and, for example, may include either units operating in connection with System z hardware and/or non-System z hardware, as further discussed elsewhere herein.

In the known system 10, System z hardware 20 may include an I/O subsystem 24 that is coupled to the I/O device 50 operates. The I/O subsystem 24 may include a Hardware System Area (HSA) that uses System Assist Processors (SAPs). Similarly, the system 100 according to an embodiment of the system described herein may be used in connection with System z hardware 110. The system described herein provides for use of a simulated z/OS (EzOS) 112 on System z hardware 110 and thereby may reduce the need for z/OS software. The system 100 may include an I/O subsystem 114 similar to the I/O subsystem 24 discussed in connection with the known system 10, but which interfaces and otherwise interacts with the EzOS 112, as further discussed elsewhere herein.

According to the system described herein provides, EzOS provides an I/O computing environment that can establish and maintain high level of I/O activity with as little additional processor utilization as possible. As a simulated z/OS, EzOS may operate with System z hardware and simulate System z instructions and structures, as further discussed elsewhere herein. For example, for I/O processing on a System z hardware device, the system described herein may provide for modification of a Subchannel-Information Block (SCHIB) of the I/O subsystem using the ModifySubChannel (MSCH) instruction. Other I/O System z processing instructions may be simulated and manipulated using EzOS, as further discussed elsewhere herein.

System z I/O instructions that may be performed using EzOS may include, for example: channel subsystem call (CHSC); clear subchannel (CSCH); halt subchannel (HSCH); reset channel path (RCHP); resume subchannel (RSCH); set address limit (SAL); set channel monitor (SCHM); start subchannel (SSCH); store channel path status (STCPS); store channel report word (STCRW); store subchannel (STSCH); test pending interruption (TPI); test subchannel (TSCH); and cancel subchannel (XSCH). It should be noted that the CHSC instruction may be allowed to support the channel configuration commands according to the system described herein. I/O instructions that are not emulated by EzOS may be identified as no operation (NOP) instructions. The emulation and simulation of hardware I/O structures according to the described system are further discussed elsewhere herein. Simulated z/OS macros may also be supported using EzOS. For example, macro functionality may be provided to simulate: GETMAIN, FREEMAIN, WAIT, STARTIO, TRACE, STIMER, LOAD, CALL, DYNALLOC, ESTAE, READ, WRITE, ATTACH, as further discussed elsewhere herein.

In System z, the SCHIB is created in the HSA at initial microcode load (IML) time from the input output configuration data set (IOCDS) and may be modified using the MSCH instruction. According to the system described herein, a simulated SCHIB may be structured just as in System z (and/or other desired systems) and modified using similar System z instructions. An I/O definition file similar in format to the IOCDS may be used to define the I/O configuration and the manipulation and ownership of the SCHIB fields may be the same as with System z. Further, in an embodiment of the system described herein using non-System z hardware, emulated hardware systems, for example channel emulators, may provide for emulation of the I/O subsystem (HSA), as further described elsewhere herein.

The system described herein may support at least one initial program load (IPL) processor and may include multiple processor support. During the IPL process of the simulated z/OS described herein, an IPL module (e.g., EZOIPL00) is loaded at initial program loading from the IPL sequence. An IPL device (for example, at a location CYLINDER 0 HEAD 0) may contain records that may be read by the IPL processor. A first record may be a program status word (PSW), containing information about the program state used by the operating system, and a channel program that reads in the second record. The second record may be a channel program that reads in the IPL module (EZOIPL00). The IPL module may be loaded at real storage location zero and may contain a first section of a memory map, as further discussed elsewhere herein.

Figure 2:
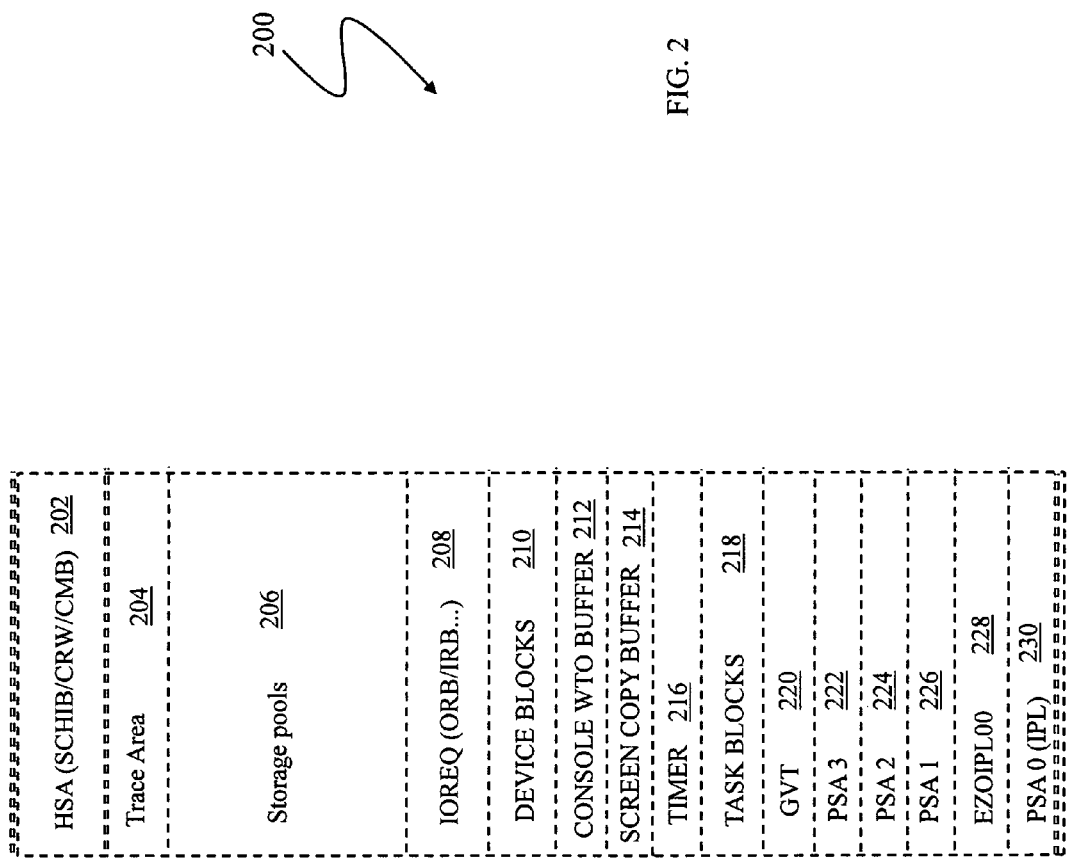
FIG. 2 is a schematic illustration of a memory map showing how addresses have been allocated for memory and any other devices for the simulated z/OS (EzOS) according to an embodiment of the system described herein.

FIG. 2 is a schematic illustration of a memory map 200 showing how addresses may be allocated for memory and other devices for the EzOS according to an embodiment of the system described herein. In an embodiment, the memory map 200 may correspond to approximately one gigabyte of memory. A section 202 of the memory map 200 may identify the HSA, and/or other I/O subsystem area, and may contain the SCHIB structure and channel report word (CRW) and channel measurement block (CMB) structures, as further discussed elsewhere herein. A section 204 may identify a trace area for general trace facility (GTF) type trace records such that GTF-type formatting utilities may process data. A section 206 may identify storage pools containing general storage and structure to support I/O requests. Storage areas for channel command word (CCW), indirect data address word (IDAW) and modified IDAW (MIDAW) structures may be contained in the section 206. In various embodiments, the section 206 may include multiple pools of varying storage amounts, including storage pools from 4 k to 256 k.

A section 208 may identify an input output request (IOREQ) structure that represents an I/O request and contains the structures necessary to support an I/O operation. Multiple IOREQ structures may be included. The hardware structures operation request block (ORB) and interruption request block (IRB) may be contained in the IOREQ structure along with other relevant information to support I/O operations. A device block (DEVICE) section 210 represents an I/O device to the operating system and may be a direct access storage (DASD) device. There may be a 1-to-1 correspondence of each SCHIB to each DEVICE.

A section 212 may identify a console Write to Operator (WTO) buffer and a section 214 may identify a screen copy buffer. A section 216 may identify a timer. A section 218 may identify one or more task blocks (TASKs) that maintain information of tasks in the system, as further discussed elsewhere herein. A section 220 identifies the Global Vector Table (GVT) which is an anchor structure and contains pointers to other areas and may, as well, contain other system level substructures, such as a lock table that may control access to serial reusable resources.

Note that in various embodiments, other control structures may be used in connection with the system described herein and incorporated into the memory map 200. For example, a subsystem control block (SSCB) may represent the different SSIDs for physical controllers corresponding to the I/O devices. There may be one SSCB for each SSID defined to a controller. The SSCB is a list structure and the head may be pointed to by the PhyCntl. A physical control unit table (PhyCntl) may be a structure representing a physical controller. The PhyCntl may be the anchor structure for the I/O device behind the controller. Each physical controller may have a unique serial number. Multiple PhyCntls may be used for multiple controllers. For example, in an embodiment, for a Symmetrix device with a split control unit, multiple PhyCntls may be used. PhyCntl may be a list structure and the head may be pointed to by the GVT.

A plurality of sections 222, 224, 226 may identify prefix storage areas (PSAs) 3, 2, 1. PSAs provides the hardware fixed storage locations for the physical processors. Each physical processor may be assigned to a logical partition (LPAR) of the system and may have its prefix register set to a defined area to avoid overlap. The fixed areas may be primarily used during interrupts. A section 228 may identify an initial program load (IPL) module such as EZOIPL00, as further discussed elsewhere herein. A section 230 may identify a PSA 0 which is the IPL central processor hardware fixed storage area. The module EZOIPL00 may be read in at IPL time.

In an embodiment, an IPL module, such as EZOIPL00, may perform the following functions in connection with initial program loading operations. A PSA may be set up for an IPL processor. The IPL processor may have a prefix register of zero. In the case of multiple processors, before the other processors are brought online, a signal processor instruction may be issued to set the prefix register value of the IPL processor. Interrupt handlers may also be set up. A supervisor call (SVC) may be set up for requesting operating system service functionality, such as a call for dynamic allocation. The GVT may be set up, which contains the pointers to the other areas and contain other system level substructures. Further, resource initialization modules (RIMS) may be called, including storage manager and I/O initialization modules. Console device communication may be enabled, the console device permitting an operator to communicate with the system. Processing control may then be passed to the dispatcher, as further discussed elsewhere herein.

On entry to the interrupt handlers (specified addresses for which may be set by hardware contained in the PSA), the registers may be saved in a task block (TASK), if one is active. The TASK may contain a save area for registers/PSW when going into a wait state and during an interrupt. The TASK is an element of the dispatch queue and can be marked non-preemptable so that, after an interrupt, control may be returned to the TASK instead of returning to the dispatcher.

A queue element of the dispatcher may be the TASK which may be located in the GVT, for example at GVTHTCB, and the active TASK addresses, if an active TASK exists, may be contained in GVTATCB. The dispatcher queue may always include at least two TASKs—one for the console device and one for the timer task. For any interrupt, if there is an active TASK, then the current task state is saved in the TASK. The interrupt handler then performs the appropriate processing and then, on exit from the interrupt handler, control may return to the dispatcher or, if the TASK is non-preemptable, then control may be returned to the interrupted TASK. A @WAIT macro may save the current state in the TASK and then branch to the dispatcher. If there is no pending work to be done then an enabled wait state is entered. In most cases, when in a wait state, an interrupt from an I/O will occur and an IOREQ will be marked complete and moved to the complete IOREQ queue. The corresponding TASK for this IOREQ may be marked as needing service. The I/O interrupt may come from a test program but may also come from the console device. Another method of coming out of the enabled wait state is the timer interrupt in which the timer TASK will be marked as needing service. A @STIMER macro may be supported such that when a @STIMER is issued, a timer queue element (#TQE) is built and chained off the GVTH-TQE which will point to the TASK or exit to be driven when the time interval expires. If the timer queue element points to a TASK then timer queue element will be marked service pending and dispatachable. If the timer queue element is an exit, the exit will be driven out of the external interrupt first level interrupt handler (FLIH).

An I/O supervisor may handle I/O initialization along with the construction of the I/O structures. In addition, the @STARTIO interface may be included which includes queuing the IOREQ to the DEVICE and starting the request if the DEVICE is not active. Functionality may include parallel access volume (PAV), Dynamic PAV (DPAV) and Hyper PAV (HPAV) processing. The I/O supervisor may have a TASK on the dispatch queue at all times for I/O MIH process and/or other I/O tasks. After being set up for a request, an IOREQ passes to an IOREQ manager which will start the I/O request if a DEVICE is not active. If the DEVICE is active, the IOREQ may be queued on the DEVICE for execution. Once the IOREQ is started, it may also be queued on the active IOREQ list. When the request is complete, the IOREQ may then be moved to the IOREQ complete list by the I/O interrupt handler. The program IOPLAY may be supported to run on the system and, in an embodiment, a different I/O profile may be supported on each DEVICE with all defined DASD devices running in parallel. The system described herein may support I/O operations for multiple devices, such as 64 k devices.

Access methods for writing to a direct access storage device (DASD) may be supported according to the system described herein. For example, the system described herein may support sequential and partitioned data set (PDS) files. In an embodiment, the access method may parallel the Multiple Virtual Storage (MVS) operating system such that files may be shared across MVS and EzOS, and, for example, the MVS GTF-type trace formatting program may be used to process data. Storage management may be based off the system planning tool (SPT) storage pool manager. The macros @GETMAIN/@FREEMAIN may be used and provided to support the parameters needed for test suite programs, such as the STCMON test suite provided by EMC Corporation of Hopkinton, Mass. A parameter may specify the storage key that may be used. Further, the @ESTAE macro may be supported to create a recovery environment. An area in the TASK may define the system diagnostic work area (#SDWA). An eight depth recovery stack may be used that allows percolation. The machine check FLIH may use the area in the TASK for recovery.

In an embodiment, the system described herein may operate with a dynamic address translation (DAT) system off and use storage keys to provide operating system/application segmentation. Alternatively, the DAT system may be turned on to provide a 1-to 1 correspondence from a real to a virtual page. System z DAT technology is used by z/OS, and other zSeries operating systems, to enable the activation and concurrent use of multiple 64-bit virtual memory spaces by multiple processes running under each OS instance.

Figure 3:
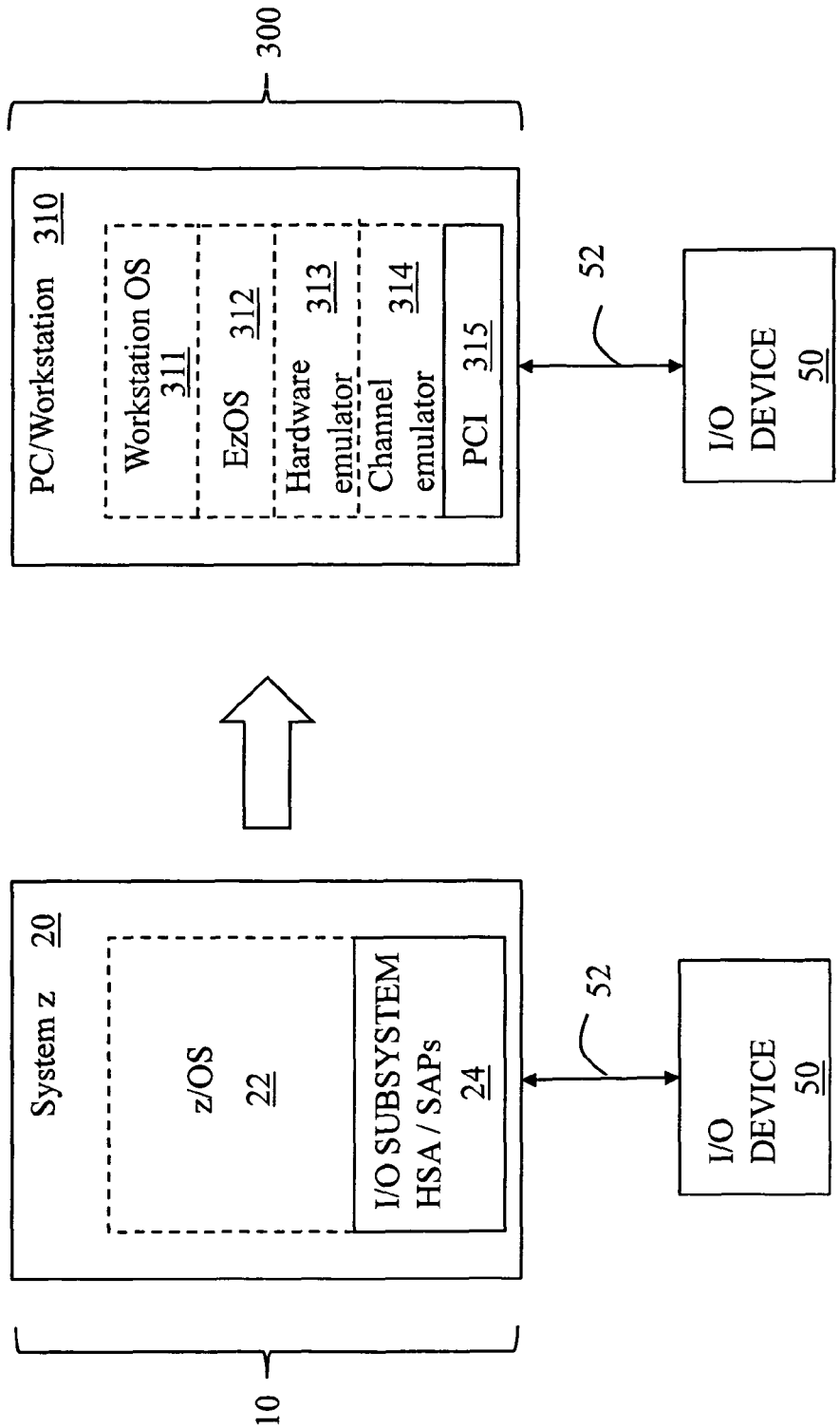
FIG. 3 is a schematic illustration showing use of the simulated z/OS (EzOS) on non-System z hardware, such as a PC/Workstation according to an embodiment of the system described herein.

FIG. 3 is a schematic illustration of a system 300 showing use of a simulated z/OS system (EzOS) 312, similar to the EzOS 212 discussed elsewhere herein, on a non-System z hardware system 310, such as a PC/Workstation running Linux or other non-System z operating system 311, according to an embodiment of the system described herein. In FIG. 3, the system 300 is shown in comparison to the known system 10, as further discussed elsewhere herein. The PC/Workstation 310 may have EzOS 312 loaded thereon and may further include a hardware emulator 313 (such as the Hercules Emulator, an open source software program that allows emulation of the System z instruction set, as further discussed elsewhere herein) and a channel emulator 315, as further discussed elsewhere herein. A Peripheral Component Interconnect (PCI) 315 may provide an interconnection for I/O operations with the I/O device 50, such as the Symmetric data storage facility from EMC Corporation. The system 300 provides for simulation of a System z I/O subsystem using non-System z hardware. Using the system described herein, the I/O processing on the non-System z hardware may operate with FICON and/or with other appropriate channel protocols. According to the system described herein, I/O operations of the I/O device 50 may be substantially unaffected when using the system 300 as compared with the known system 10.

A known emulator of z/Architecture hardware systems, and other computer systems, is the Hercules Emulator, an open source software program created by Roger Bowler and released under the Q Public license. The Hercules Emulator is an open source software implementation of mainframe System/370, ESA/390 and z/Architecture hardware. For example, using Hercules, a PC workstation can emulate a mainframe processor. Hercules implements raw S/370, ESA/390 and z/Architecture instruction sets but does not provide operating system facilities. For further discussion of the Hercules Emulator, see, for example, *Hercules—General Information*, Version 3, Release 05, Modification 0, Publication No. HEGI030500-00, Sep. 1, 2007, which is incorporated herein by reference. In various embodiments, the system described herein may used in connection with computer architecture emulators, such as Hercules, as further discussed elsewhere herein.

In an embodiment, the system described herein provides for a channel emulator to emulate data transfer paths in I/O operations. The channel emulator may simulate a host channel to provide I/O connectivity with an I/O device and may provide for the I/O connectivity using different channel protocols. For example, IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith. For example, Symmetrix, provided by EMC Corporation of Hopkinton, Mass., is a disk storage facility that may be compatible with FICON. For further discussion of FICON in connection with IBM System/390, a precursor to IBM System z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference.

The channel emulator according to the system described herein may simulate System z I/O structures. For example, the channel emulator may simulate the structure of the SCHIB as in System z such that manipulation/ownership of the SCHIB fields may be the same but with the channel emulator, and/or other emulated components, acting as the I/O subsystem. The channel emulator may be referred to herein as "CHEM". In an embodiment, the system described herein may provide for FICON I/O, and/or I/O operations using other appropriate channel protocols, with a non-System z computing platform, as further discussed elsewhere herein.

Multiple-channel subsystem (MCSS) functions may be provided to the operating systems executing in each of the system's logical partitions (LPARs). In an embodiment, the system described herein may provide for 128+LPAR simulation. For further discussion of channel-subsystem hardware and software in zSeries systems, including multiple-channel subsystem I/O configurations, see Wyman, et al., "Multiple-logical channel subsystems: Increasing zSeries I/O scalability and connectivity," IBM J. Res. & Dev., Vol. 48, No. 3/4, May/July 2004, pp. 489-505, which is incorporated herein reference.

In various embodiments, the system described herein may be used to run other MVS applications. In some cases, the applications may be reassembled. In other cases, the applications may be run with an emulator, such as a z/OS service emulator. Further, the system may be used in connection with a Geographically Dispersed Disaster Restart (GDDR) control system, an outboard data migration system, a tape backup engine, a database and sort offload processing engine, a storage management subsystem (SMS) data mover, and/or a data at rest encryption engine, among other uses.

In accordance with the system described herein, fault injection may be used as a technique to evaluate the dependability of computer systems, such as the I/O device 50. Faults may be injected using software or hardware systems to test and evaluate computer systems. For example software based fault injection may include compile-time injection which involves modification and/or mutation of source code to inject simulated faults into a system. Another fault injection technique involves runtime injection in which a fault is injected into a running software system. Faults may be injected using triggers, such as time based triggers (e.g., when a timer reaches a specified time an interrupt is generated and an interrupt handler associated with the timer injects the fault) and interrupt based triggers (e.g., an interrupt is generated at a specific place in the system code or on a particular event within the system, such as access to a specific memory location). In the testing of operating systems, for example, fault injection may be performed by a driver (kernel-mode software) that intercepts system calls (calls into the kernel) and returns a failure for some of the calls. Hardware fault injections may include simulating faults in memory (I/O, RAM) and/or a processing unit, such as a CPU. It should be noted that injection of I/O faults may be difficult in closed systems, such as in a System z computing platform running z/OS.

The system described herein provides for the injection of I/O faults in a closed system, for example, the injection of I/O link level faults on FICON using a simulated computing environment, such as an emulated System z channel subsystem, as further discussed elsewhere herein. The I/O link level may include data processing systems and logic that controls the data link with I/O devices. In an embodiment, the system described herein provides for the modification of I/O level System z instructions, such as the MSCH instruction, using simulated computing environments that allow enhanced access to features and functionality of computing systems in connection with fault injection, as further discussed elsewhere herein.

Figure 4:
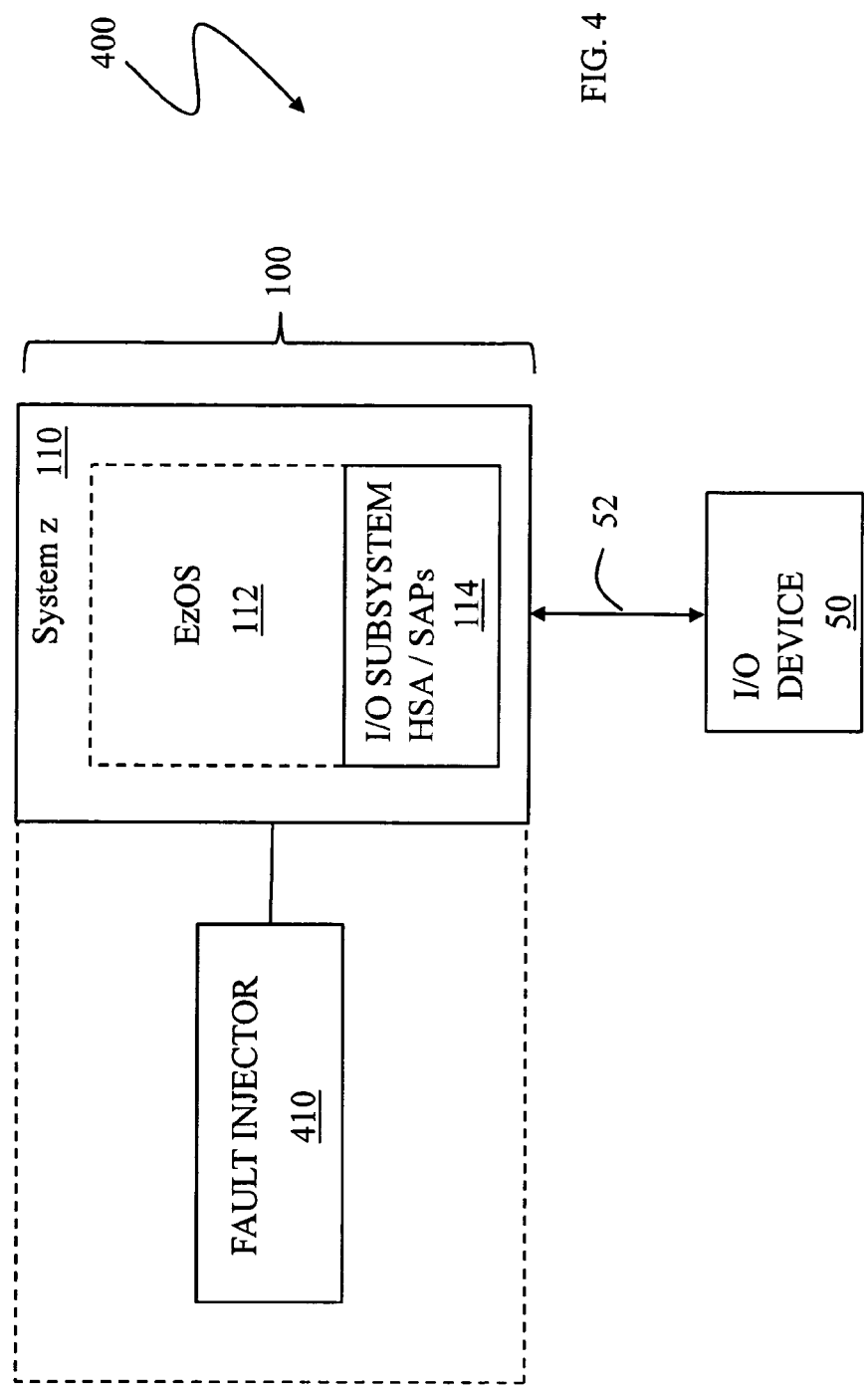
FIG. 4 is a schematic illustration of a system under test including a fault injector that communicates with the system that includes the simulated z/OS (EzOS) running on System z hardware according to an embodiment of the system described herein.

FIG. 4 is a schematic illustration of a system under test 400 including a fault injector 410 that communicates with the system 100 that includes a simulated OS, such as a simulated z/OS (EzOS) 112 running on System z hardware 110 according to an embodiment of the system described herein. Since the I/O subsystem 114 of the System z hardware 110 is a closed system, the fault injector 410 may provide for somewhat limited injection of I/O faults to provide testing and/or other functionality of the system 100, specifically fault injection that may be provided in connection with EzOS. The fault injector 410 may be coupled to the system 100 and may include a software module or tool and/or may include a stand-alone device coupled to the System z. The fault injector 410 is shown coupled with the system 110 via a broken line to indicate that it may be a software tool loaded on the system 110 and/or may be a separately coupled device.

Figure 5:
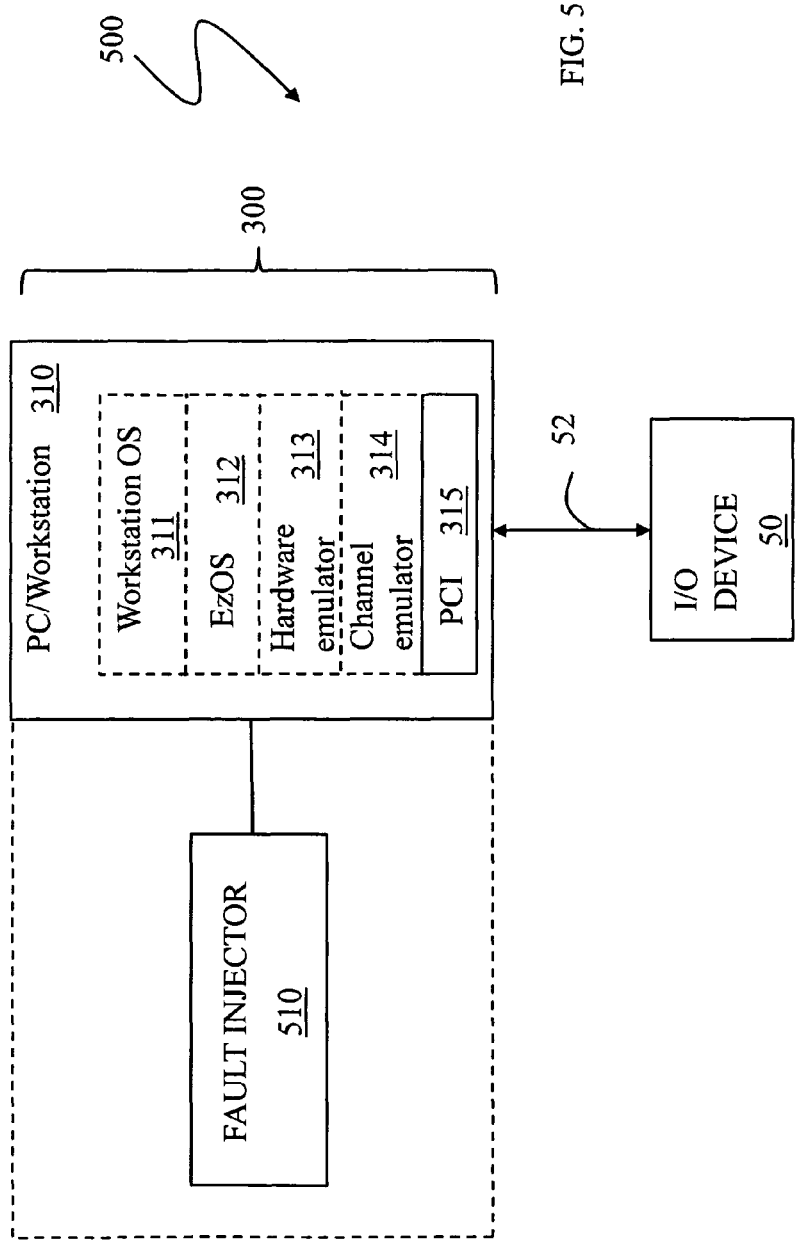
FIG. 5 is a schematic illustration of a system under test including a fault injector that communicates with the system that includes the simulated z/OS (EzOS) and/or with components of the non-System z hardware workstation.

FIG. 5 is a schematic illustration of a system under test 500 including a fault injector 510 that communicates with the system 300 that includes a simulated OS, such as a simulated z/OS (EzOS) 312 and/or with components of the non-System z hardware workstation 310. The fault injector 510 may provide for injection of I/O faults to provide testing and/or other functionality of the system 300 and may provide for injection of I/O faults in connection with EzOS and the non-System z hardware 310. The fault injector 510 may be coupled to the system 300 and may include a software tool and/or may include a stand-alone device. The fault injector 510 is shown coupled with the system 310 via a broken line to indicate that it may be a software tool loaded on the system 310 and/or may be a separately coupled device.

Figure 6:
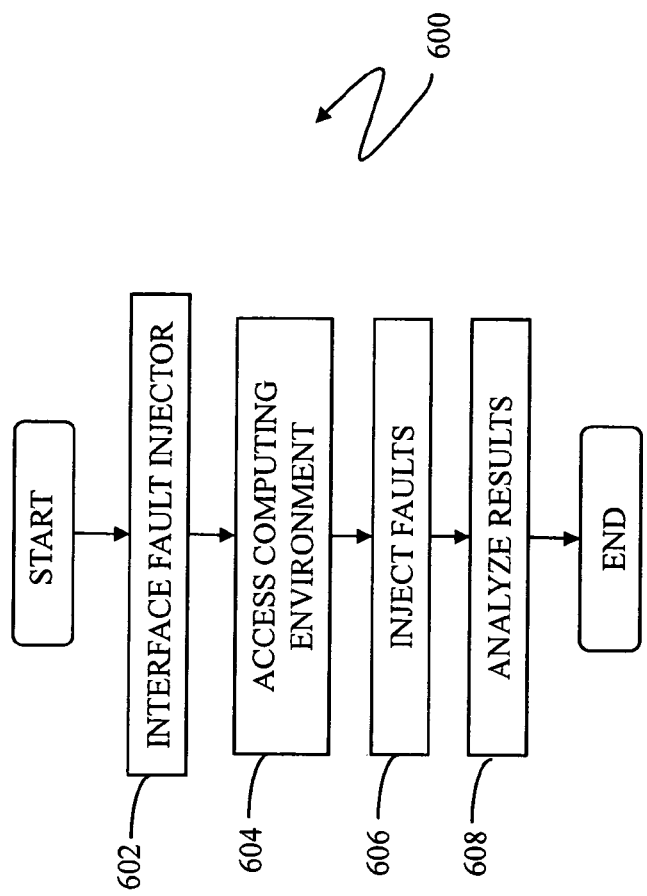
FIG. 6 is a flow diagram showing fault injection processing according to an embodiment of the system described herein.

FIG. 6 is a flow diagram 600 showing fault injection processing according to an embodiment of the system described herein. At a step 602, a fault injector, such as the fault injector 410 or the fault injector 510 as discussed elsewhere herein, is interfaced with a system under test and/or otherwise activated in connection with the system under test. In various embodiments, the fault injector may be a software module or tool that is loaded onto the system under test and/or may be a separate device that is coupled to the system under test. Further, in various embodiments, the system under test may included emulated system components, such as emulated System z components including a simulated z/OS (EzOS) and/or emulated z/Architecture hardware components, as further discussed elsewhere herein. After the step 602, processing proceeds to a step 604 where the fault injector accesses appropriate software and/or hardware systems of the system under test in connection with fault injecting. The fault injector may interface with the simulated z/OS and/or with emulated z/Architecture components, such as a channel emulator that emulates an I/O subsystem of System z.

After the step 604, processing proceeds to a step 606 where the fault injector injects one or more faults in connection with testing the system in a desired manner. In various embodiments, the injected faults may include compile-time faults and runtime faults and may include operating system faults, I/O link level faults and/or other hardware faults, as further discussed elsewhere herein. Examples of faults that may be injected include: an invalid cyclic redundancy check (CRC), invalid sequences, an invalid Device Information Block (DIB), and/or out of bound sequences, such as F_Port Login FC-PH ELS (FLOGI), and/or other faults that do not follow the FICON specification (FC-SB-3).

Further, according to the system described herein, fault injection may performed at the channel protocol level. For example, the channel program may specify a Synchronize Send Status (SSS) or Command Response Request (CRR) flag for any individual CCW. The SSS and CMF flags may affect the protocol by causing both the channel and the control unit to process commands differently. A real channel implementation (such as the IBM Z FICON) may not allow the user to control (or even be directly aware of) these flags. However, under rare circumstances, unusual combinations of flags may occur that may affect system operation. For fault injection purposes and evaluation thereof, the system described herein may provide for causing the occurrence of unusual combinations of flags. Additionally, much of the FICON protocol may depend on in-order delivery of information packets, and FICON fibre channel switches may be used to perform appropriate in-order delivery. However, low-level Fibre Channel chips (e.g., Emulex) used to send and receive the packets may provide only limited ordering capability. For fault injection purposes and evaluation thereof, the system described herein may cause out-of-order packet delivery events to occur. Furthermore, the system described herein may simulate link and switch hardware problems by purposefully disregarding and/or corrupting information packets, and the system described herein may simulate very large switched configurations that may be expensive to build with real hardware.

After the step 606, processing proceeds to a step 608 where results from the fault injection are analyzed and/or displayed. After the step 608, processing is complete.

It should be noted that application test suites may provide testing of software and/or hardware systems in connection with System z computing platforms, for example, and may be used and/or otherwise operated in connection with the system described herein. One such test suite is the STCMON test suite provided by EMC Corporation of Hopkinton, Mass.

The systems and processes discussed herein may be implemented on a computer-readable medium, such as a computer memory and/or portable hardware memory medium, on which is stored executable code that, when executed by at least one processor, performs one or more of the operations and/or processes discussed herein.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for injecting I/O faults, comprising:
   providing a simulated computing environment, wherein the simulated computing environment includes a simulated operating system;
   accessing the simulated computing environment with a fault injector; and
   injecting I/O faults into the simulated computing environment, wherein injecting the I/O faults into the simulated computing environment includes injecting the I/O faults into an I/O portion of the simulated operating system.

2. The method according to claim 1, wherein the simulated operating system is a simulated z/OS.

3. The method according to claim 1, wherein the simulated computing environment includes a simulated System z platform.

4. The method according to claim 3, wherein the simulated System z platform includes a simulated I/O subsystem that is modifiable with the fault injector.

5. The method according to claim 1, wherein the simulated computing environment includes a channel emulator.

6. The method according to claim 5, wherein the channel emulator acts as an I/O subsystem providing FICON communication capability.

7. A computer-readable medium storing computer software that injects I/O faults, the computer software comprising:
   executable code that provides a simulated computing environment, wherein the simulated computing environment includes a simulated operating system;
   executable code that accesses the simulated computing environment with a fault injector; and
   executable code that injects I/O faults into the simulated computing environment, wherein the executable code that injects the I/O faults into the simulated computing environment includes executable code that injects the I/O faults into an I/O portion of the simulated operating system.

8. The computer-readable medium according to claim 7, wherein the simulated operating system is a simulated z/OS.

9. The computer-readable medium according to claim 7, wherein the simulated computing environment includes a simulated System z platform.

10. The computer-readable medium according to claim 9, wherein the simulated System z platform includes a simulated I/O subsystem that is modifiable with the fault injector.

11. The computer-readable medium according to claim 7, wherein the simulated computing environment includes a channel emulator.

12. The computer-readable medium according to claim 11, wherein the channel emulator acts as an I/O subsystem providing FICON communication capability.

13. A method for simulated computer environment processing, comprising:
   providing a simulated computing environment, wherein the simulated computing environment includes a simulated operating system that provides simulated z/OS functionality;
   running a z/OS process on the simulated computing environment using the simulated operating system.

14. The method according to claim 13, wherein the simulated computing environment includes a simulated System z platform.

15. The method according to claim 13, wherein the simulated computing environment includes a channel emulator.

16. The method according to claim 15, wherein the channel emulator acts as an I/O subsystem providing FICON communication capability.

* * * * *